United States Patent
Walker (10) Patent No.: US 8,132,719 B2
(45) Date of Patent: Mar. 13, 2012

(54) PREPAID PAYMENT DEVICE ADMISSION TICKETING

(75) Inventor: Brian Andrew Walker, San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 12/019,905

(22) Filed: Jan. 25, 2008

(65) Prior Publication Data

US 2009/0188983 A1 Jul. 30, 2009

(51) Int. Cl.
*G06K 5/00* (2006.01)
(52) U.S. Cl. .................. 235/380; 235/381; 235/382
(58) Field of Classification Search .......... 235/383, 235/379, 380, 381
See application file for complete search history.

(56) References Cited

U.S. PATENT DOCUMENTS

| | | | | |
|---|---|---|---|---|
| 5,696,908 | A * | 12/1997 | Muehlberger et al. | 705/39 |
| 5,956,877 | A * | 9/1999 | Raasch et al. | 40/702 |
| 6,006,988 | A * | 12/1999 | Behrmann et al. | 235/379 |
| 7,290,705 | B1 * | 11/2007 | Shin | 235/381 |
| 2001/0018660 | A1 | 8/2001 | Sehr | |
| 2003/0004797 | A1 * | 1/2003 | Villaret et al. | 705/14 |
| 2003/0105641 | A1 * | 6/2003 | Lewis | 705/1 |
| 2004/0199454 | A1 | 10/2004 | Jungen et al. | |
| 2005/0005102 | A1 * | 1/2005 | Meggitt et al. | 713/164 |
| 2005/0021365 | A1 | 1/2005 | Nakfoor | |
| 2007/0215699 | A1 * | 9/2007 | Arego et al. | 235/380 |
| 2007/0252003 | A1 * | 11/2007 | Goldring et al. | 235/381 |
| 2007/0282740 | A1 * | 12/2007 | Wendt | 705/39 |
| 2008/0116259 | A1 * | 5/2008 | Oberan | 235/380 |
| 2009/0016204 | A1 * | 1/2009 | Pempsell et al. | 369/273 |

FOREIGN PATENT DOCUMENTS

| | | |
|---|---|---|
| BR | PI 0506044-3 | 3/2007 |
| JP | 2002-032800 | 1/2002 |
| KR | 10-2002-0059987 | 7/2002 |
| WO | WO 01/84504 A2 | 11/2001 |

* cited by examiner

*Primary Examiner* — Daniel Hess
*Assistant Examiner* — Tabitha Chedekel
(74) *Attorney, Agent, or Firm* — Chadbourne & Parke LLP; Walter G. Hanchuk (57) ABSTRACT

A prepaid payment device is used to by a consumer as a ticket to a future performance event as well as to conduct a transaction with a merchant. The consumer operates a user interface of a kiosk to select admission to the future performance event and a monetary amount to be added thereto. Payment is submitted to the kiosk for both the admission price and the monetary amount. The prepaid payment device is associated with an account that is credited with the payment. Stored on the prepaid payment device is information which includes the associated account and authorization for admission to the selected future performance event. The payment credited to the account can be for both the transaction with the merchant offering admission to the future performance event and also for an additional transaction with another merchant who may be at the venue of the future performance event.

27 Claims, 5 Drawing Sheets

PREPAID PAYMENT DEVICE ADMISSION TICKETING

BACKGROUND

The present invention relates generally to financial transactions, particularly to consumers requesting financial transactions with merchants, and more particularly to financial transactions conducted with a prepaid payment device issued by a financial institution that may be used both to gain admission to a future performance event, and for transactions with merchants other than the merchant offering admission to the future performance event.

Traditionally, to attend a future performance event, such as a music concert or theater production, a consumer purchases a paper ticket. The ticket is usually printed with the name of the event, date, time, and seating location, but no other information is stored on the ticket. This ticket can be used only for admission to the event it was purchased for and is typically collected, cancelled, or torn when the consumer enters the event venue to indicate it has been used. Once inside the venue, the consumer must purchase any desired food, memorabilia, or other items using traditional forms of payment, such as cash, credit cards, debit cards, prepaid cards, checks, or a combination thereof. The ticket and form of payment are completely separate items, requiring the consumer to carry both items when attending the event. Further, the various forms of payment can be easily stolen or lost. With forms of payment such as credit cards and debit cards, a thief can conduct substantial fraudulent monetary transactions. The ticket itself is easily damaged, sometimes intentionally in the process of gaining admission, and thus has limited value as a long term souvenir due to the blemish on its face.

Given the foregoing, it would be an advance in the art to combine the ticket for admission to a future performance event with a prepaid card to form a prepaid payment device.

SUMMARY

In one implementation, a user operates a user interface of a kiosk to select admission to a future performance event and a monetary amount over and above the that amount for future purchases at the future performance event. The user submits to the user interface payment for the admission and the monetary amount. The user receives back from the kiosk a prepaid payment device credited with the monetary amount and having storing information that includes authorization for the admission to the future performance event. The prepaid payment device includes an account in a payment processing network.

In another implementation, the user can also operate the user interface to select a limited edition art work for a surface of the prepaid payment device received from the kiosk. As such, the prepaid payment device is a souvenir of potentially appreciating value.

Another implementation includes any attendance regulation device that accepts the prepaid payment device as described above to grant the admission of an attendee to the future performance event, and also includes devices for accepting the prepaid payment device as described above for a future purchase at the future performance event.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION

A typical financial transaction includes a payment processing network where a transaction handler processes multiple transactions. The transactions are characterized by a merchant and a consumer engaging each transaction upon an associated account containing funds with a financial transaction token, where the financial transaction token is issued by an issuer to the consumer. The merchant submits the transaction to an acquirer for processing by the transaction handler who requests the issuer to obtain payment for the transactions from the funds in the associated account. The issuer forwards the payment to the transaction handler who then forwards the payment to the acquirer to pay the merchant for the transaction.

In the present context, a prepaid payment device is issued by the issuer to a consumer after the consumer submits a payment. The payment is credited to an account associated with the prepaid payment device and the payment is for admission to a future performance event and a monetary amount for use in a transaction with a merchant other than the merchant offering admission. These other merchants may or may not be located at the event venue of the future performance event. Thus, the prepaid payment device is a functional souvenir, being both a ticket to the event and a prepaid card. The additional monetary amount associated with the prepaid payment device can be used at the event to purchase, for example, food or memorabilia. Merchants at the event may have special lines for holders paying with the 'dual use' prepaid payment device and/or the merchants may offer special discounts not available to individuals who had been admitted to the event with traditional paper admission tickets.

For admission to the event and transactions not requiring proof of identification, the consumer would only have to carry a single item. Should the prepaid payment device be lost or stolen, a thief would only fraudulently conduct transactions up to the prepaid amount, thus limiting the fraud exposure accordingly. Further, the necessary physical nature of the prepaid payment device would allow it to act long term as a functional souvenir of the event with a potentially increasing collectors valuation.

Figure 1:
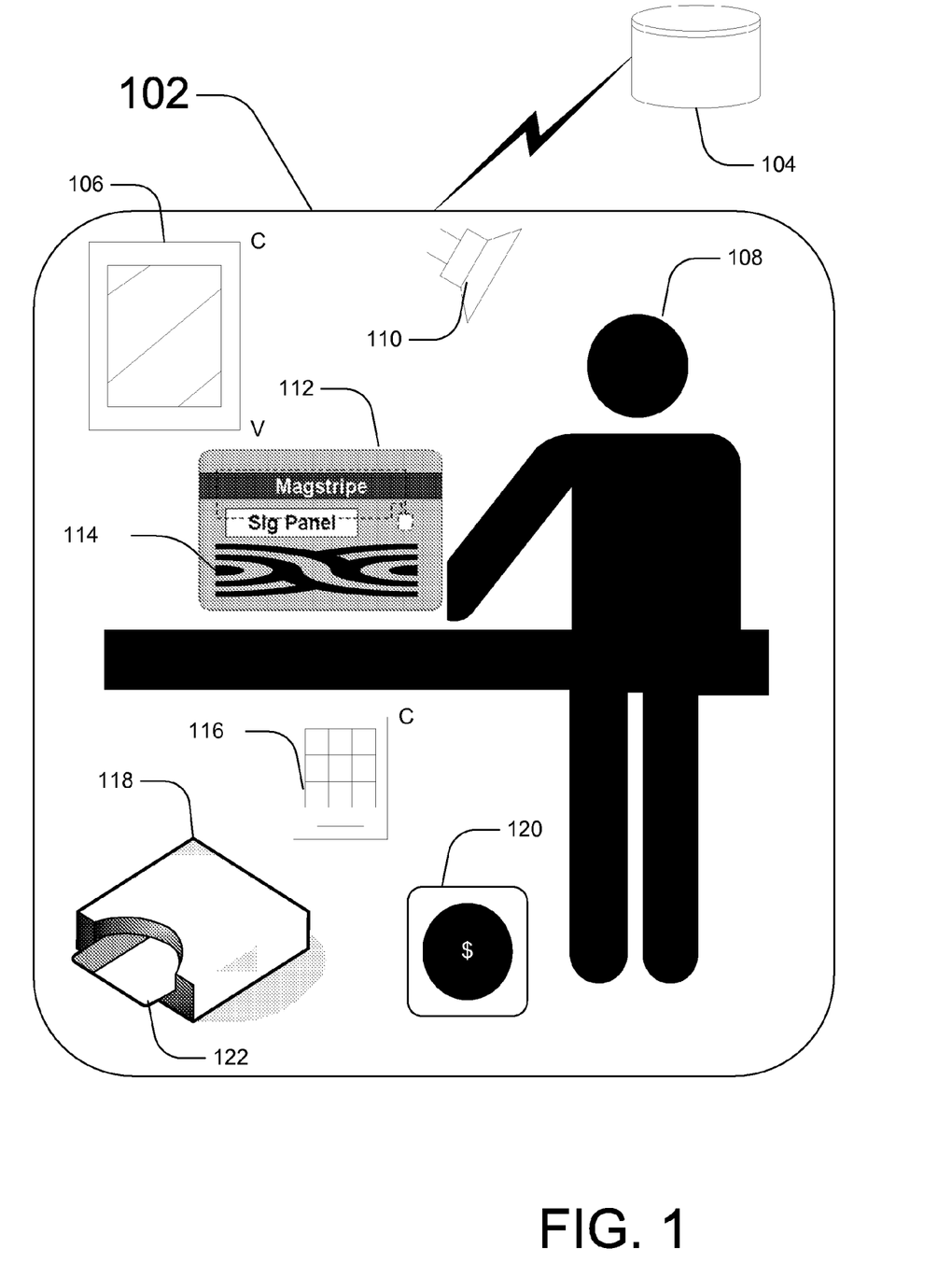
FIG. 1 depicts an exemplary implementation of a kiosk having a user interface operable by a consumer for obtaining a prepaid payment device useable as an admission pass to a future performance event and storing a monetary amount debited to an account corresponding to the prepaid payment device that is useable as negotiable currency for a transaction with a merchant at the future performance event.

FIG. 1 depicts an exemplary implementation of a kiosk 102 having a user interface operable by a consumer 108 for obtaining a prepaid payment device 112 useable as an admission pass to a future performance event and storing a monetary amount debited to an account corresponding to the prepaid payment device that is useable as negotiable currency for a transaction with a merchant at the future performance event. Although the implementation is discussed in regards to a substantially planar laminated card, one skilled in the art will recognize that other forms of financial transaction tokens could be used in the disclosed method (e.g.; key fob, key ring token, etc.) Also, implementation of the prepaid payment device can assume a form factor and other features substantially like that of a portable consumer payment device, such as a credit or debit card, adapting for instance to requirements of ISO 7810, ISO 7811, ISO 7816, and/or ISO 14443.

The kiosk 102 itself is connected to a database 104 capable of storing and relating information regarding the availability of admissions and seating at future performance events. In one implementation, the merchant offering an admission to the future performance event has access to the database 104 and may send to and receive from the database 104 information such as the number of admissions to a future performance event sold, the number of admissions remaining, the available seat locations, or any other relevant information so that the merchant (or its agent) may control access by the public to the event.

As illustrated in FIG. 1, the consumer 108 is presented with a selection of future performance events by a user interface 106 of the kiosk. The user interface may included a display 106 which can be a touch screen, a digital electronic display, a projector, a monitor, any combination of the foregoing, or any other device for the presentation of digital and/or analog information. Additionally, the kiosk 102 may have a speaker 110 or other device capable of providing audible instructions and information to the consumer 108.

The consumer 108 selects the future performance event using an input device 116. The input device 116 may be a key pad, a touch screen, a pointing device, an audio input device, a video input device, any combination of the foregoing, or other hardware and/or software combinations capable of receiving and transforming data for use by the kiosk 102. The consumer 108 then uses the input device 116 to select a monetary amount to be credited to an account associated with the prepaid payment device 112. Choices for the monetary amount may be presented on the display 106 or the consumer may directly input the monetary amount using the input device 116. Consumer 108 makes a payment for the admission and for the monetary amount to be credited to the account using mechanisms of the kiosk 102 associated with a cash receptacle 120 and/or a payment device receptacle 118. Thus, consumer 108 can make the payment to the account of the prepaid payment device 112 using cash, a prepaid spending card, a credit card, a debit card, or a combination of the foregoing. As mentioned above, the monetary amount credited to the account used by consumer 108 for a future transaction with a merchant who may be located at the venue of the future performance event. Of course, the prepaid payment device 112 may also be used to conduct a transaction with a merchant other than at the event venue.

After payment, in one implementation, the consumer 108 receives the prepaid payment device 112 from the payment device receptacle 118, which is both a financial transaction token reader and a slot from which the prepaid payment device 112 is ejected from the kiosk 102. Of course, these two mechanisms can also be separate mechanisms in the kiosk 102. In yet other implementations, the consumer 108 may receive the prepaid payment device 112 via another device, or by later third party delivery to the consumer 108.

Stored on the prepaid payment device 112 is information regarding the associated account, authorization for admission to the future performance event selected by the consumer 108, and the monetary amount optionally added by the consumer 108 for a future transaction with a merchant. The information may be stored using a magnetic strip, an integrated circuit, a contactless data communication device, a combination of any of the foregoing, or any other method and mechanism of storing information on a card.

Where applicable, the consumer 108, before receiving the prepaid payment device 112, may also select a globally unique seat location at the event venue. In one implementation, the associated account uniquely corresponds to the globally unique seat location. As such, there will be a constraint that ensures that only one admittee to the future performance can sit in one seat at that the future performance event.

The consumer 108, in another implementation, can also use the input device 116 to select an image 114 to be printed on the prepaid payment device 112 from a choice of images. The selection of images may be presented to the consumer 108 for selection upon the display 106 of the user interface. The selected image 114 on prepaid payment device 112 may correspond to the future performance event and may distinguish a performer at the event. By way of example, and not by way of limitation, the distinguishing image 114 may be a picture of a performing artist, a trademark, or other feature of distinction.

In a still future implementation, the consumer 108 can use the user interface of the kiosk to select a sound that corresponds to the future performance event and may distinguish a performer at the event. The selected sound will be stored as data into memory of a sound producing device (not show) on and/or within prepaid payment device 112. Thereafter, the consumer 108 can operate a button or other switch (not shown) on prepaid payment device 112 that will initiate the rendering of sound from the data that had been embedded into the memory for the sound producing device. Those of skill in the relevant arts will readily recognize any of several implementations that enable such sound rendering devices.

In yet another implementation, the image 114 is a limited edition image for all prepaid payment devices 112 issued, making each prepaid payment device 112 with the limited edition image 114 a desirable collectors item. Additionally, the kiosk may display how many cards with a particular image have already been purchased and the total being made available, thereby informing the consumer 108 which image will likely be the most collectable. The prepaid payment device 112 received from the kiosk by the consumer 108 will bear the selected image 114 on a surface. Further, the prepaid payment device 112 may display a flat or raised account number as well as the event name, date, and seat location. Moreover, a system of the kiosks 102, in coordination with the merchant offering the admissions to the future performance event, may ensure that database 104 and the kiosks 102 can only produce a limited number of prepaid devices 112 bearing the same selected image 114, thereby creating a scarcity thereof with a concomitant potential for an increasing collectors valuation.

In one implementation, the kiosk is capable of printing the image 114 on the prepaid payment device 112. To achieve such functionality, the kiosk may contain a card printer such as, for example, the Direct-to-Card (DTC) 550 or High Definition Printing (HDP) 5000 commercially available from Fargo Electronics, Inc., a corporation located in Eden Prairie, Minn.

It will be apparent to an individual of ordinary skill in the art that the consumer 108 may use kiosk 102 to purchase multiple prepaid payment devices 112 at the same time, thereby allowing the consumer 108 to purchase admission to the future performance event for a group of individuals and/or to select a corresponding globally unique seat for each admission of each individual so as to be seated or otherwise located next to or near to one another. The consumer 108 in such a situation may select different monetary amounts to be associated with or otherwise credited to the account of each prepaid payment device 112. Thus, for example, the consumer 108, may purchase one prepaid payment device 112 where a monetary amount is credited to the associated account in addition to the admission fee, but may purchase another prepaid payment device 112 that is credited with only the price of admission (e.g.; no additional monetary amount is stored on the account corresponding to that prepaid payment device 112). For each admission to the future performance event that had been purchased, the kiosk will thus issue a separate prepaid payment device 112 to the consumer 108. Thus, each admittee will have their own prepaid payment device 112 to gain admission to the future performance event.

Figure 2:
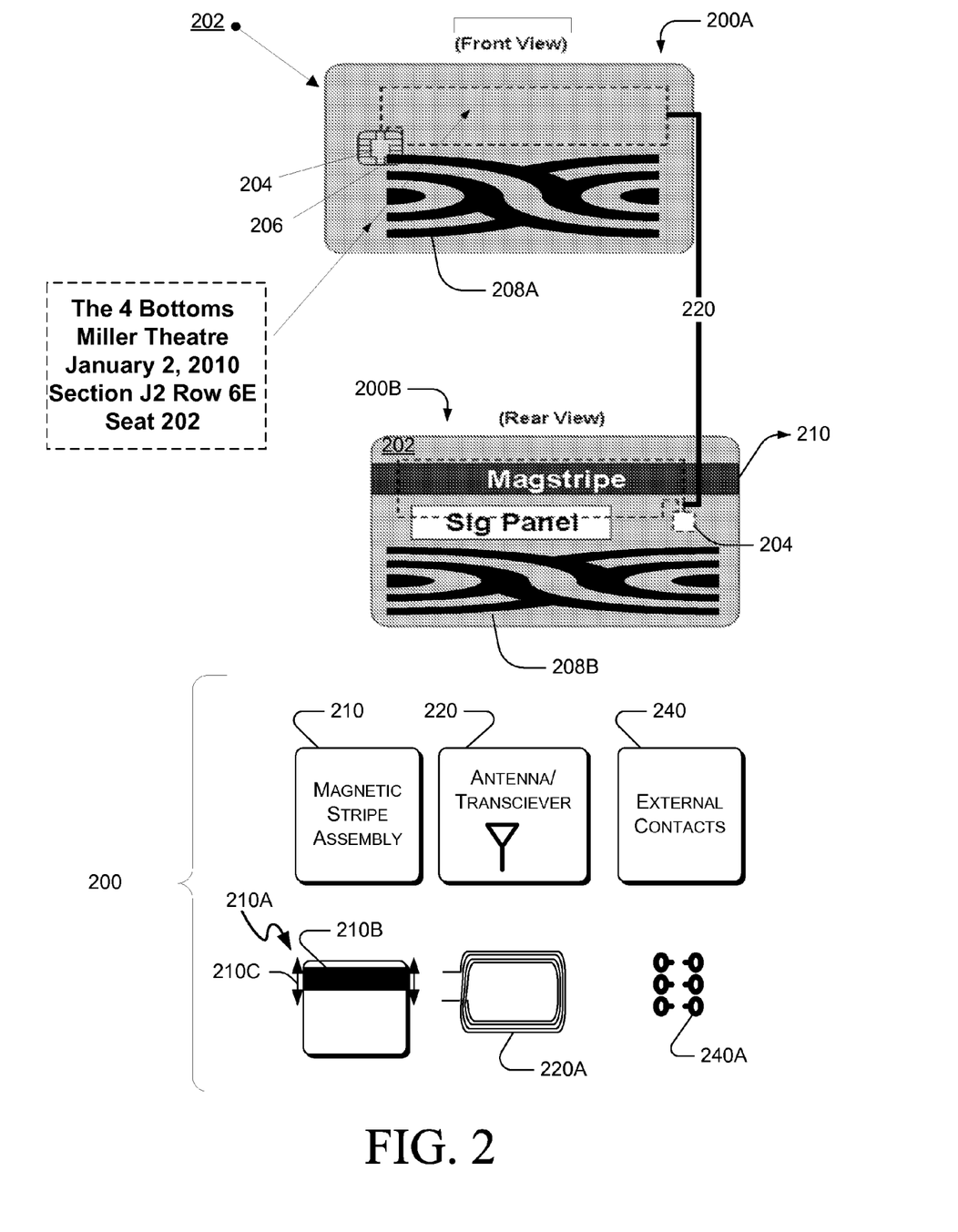
FIG. 2 illustrates an exemplary implementation of the prepaid payment device of FIG. 1.

Referring now to FIGS. 1-2, both a front and rear views (200A, 200B) of an exemplary prepaid payment device 202 are presented. Images may be displayed on both sides of the prepaid payment device 202, with an image 208A on the front view 200A being either the same as or different from an image 208B on the rear view 200B. Consumer 108 can operate the user interface of kiosk 102 to select both image 208A and 208B. In this illustration, the front view 200A also displays information about the event such as the event title, venue name, date, and seating location at the venue.

FIG. 2 also shows exemplary implementations of a data encoding area of the prepaid payment device 202. The data encoding area may include an optional shielding element, which allows desired electromagnetic, optical, or radiative signals to penetrate while protecting the data encoding area from physical abuse or damage. The prepaid payment device 202 may optionally have areas outside of the data encoding area shielded from physical abuse or otherwise acceptable forms of electromagnetic radiation. Some of the acceptable signals that are allowed to penetrate the shielding and may include, but are not limited to, signals accompanying a magnetic field, RFID signals, IrDA signals, visible light, invisible light, modulated laser, and/or modulated RF communication signals. By way of example and not by way of limitation, a selective shielding element may comprise a clear plastic shield, conformal coatings, an opaque plastic shield, or a clear thin film, depending on the implementation of the data encoding area.

Non-limiting examples of the data encoding area are shown at reference numeral 200, and include a magnetic stripe assembly 210, an antenna and/or transceiver 220, and electrical contacts 240, The magnetic stripe assembly 210 may comprise, in one implementation 210A, a reprogrammable magnetic stripe 210B that accepts data and/or commands from a processor and formats and renders that data into a form on a magnetic stripe that is readable by conventional merchant magnetic stripe-reading point of sale (POS) terminals. In this manner, the processor may program a particular account for use in a transaction as a function of user input selecting the account. Alternatively, the processor may erase the magnetic stripe of the assembly 210, rendering the card useless in the event of its loss or theft. In one implementation shown 210A, the magnetic stripe assembly 210B at least partially slidably moves 210C into and out of an assembly of the prepaid payment device 202 (partial view shown), allowing the prepaid payment device 202 to conduct a financial transaction at a point of sale terminal that includes a magnetic stripe reader.

Also in FIG. 2 is an exemplary implementation of the data encoding area shown as an antenna and/or transceiver 220. The antenna 220 may include commonly used loop inductors such as the one shown 220A or in those shown in related ISO standards for RF-readable smart cards. With such an interface, account data may be translated, modulated and transmitted in a manner acceptable by an RF contactless merchant POS terminal, a 802.11 WiFi or WiMax network, or by a cellular or RF communications network.

External contacts 240 are yet another alternative implementation of the data encoding area shown in FIG. 2. With the prepaid payment device 202 possessing physical contacts such as an array of conductive pads or shapes 240A, the financial transaction token may be placed in physical contact with a merchant POS terminals, and the external contacts 240 may establish connectivity to the merchant's financial processing system. The processor may relay account-related information to the merchant POS terminal through the contact interface, thereby allowing the prepaid payment device 202 to be utilized with the large number of preexisting merchant POS terminals.

Figure 3:
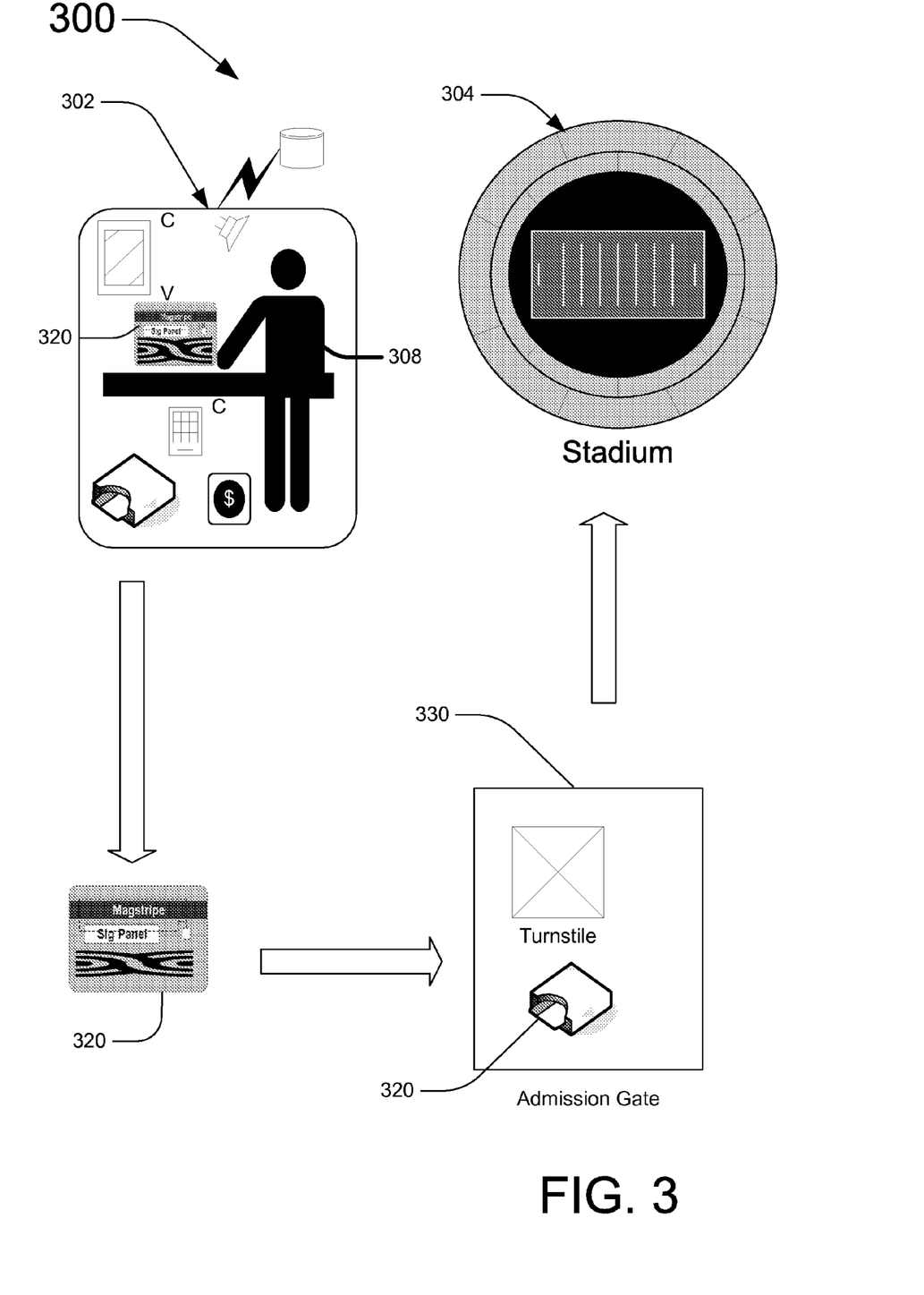
FIG. 3 depicts a flowchart of an exemplary method for obtaining the prepaid payment device of FIG. 1 from the kiosk of FIG. 2 to use as an admission ticket to a future performance event see in FIG. 3 at which the prepaid payment device is useable to conduct a transaction with a merchant with a stored monetary value debited to an account corresponding to the prepaid payment device.

FIG. 3 depicts a flowchart of an exemplary method 300 for a consumer 308 to obtain a prepaid payment device 310 from the kiosk 302 to use as an admission ticket to a future performance event at a venue 304. In method 300, the consumer 308 obtains the prepaid payment device 320 for admission to a future performance event, where the prepaid payment device 320 can also be used by the consumer 308 to conduct a transaction with a merchants at the venue 304, where that merchant may be a different merchant that the merchant who sold the admission to the future performance event to the consumer 308. Stored on the prepaid payment device 320 is information, including approval for admission to the event and a monetary amount for a transaction with the same or other merchant. Thus, when the consumer 108 attends the future performance event, the prepaid payment device 320 can be used by the consumer 108 in lieu of traditional paper tickets to gain entrance and also in lieu of currency or other payment devices and method to conduct a transaction with a merchant. Depending on the method used to store information on the prepaid payment device 320, the information might be read from the prepaid payment device 320 by being "swiped", inserted into a card reader, or read by a contactless reader at the admission gate of the event or other Point of Service (POS) terminal 330. The consumer 308 is then allowed to pass through the turnstile or other type of gate to enter the venue 304.

In FIG. 3, the venue 304 is illustrated as a stadium. In another implementation, consumer 308 operates the user interface of the kiosk 302 to select a globally unique seat location at the event venue 304. In yet another implementation, the account associated with the prepaid payment device 320 uniquely corresponds to the selected globally unique seat location. This location may be printed on the prepaid payment device 320.

Figure 4:
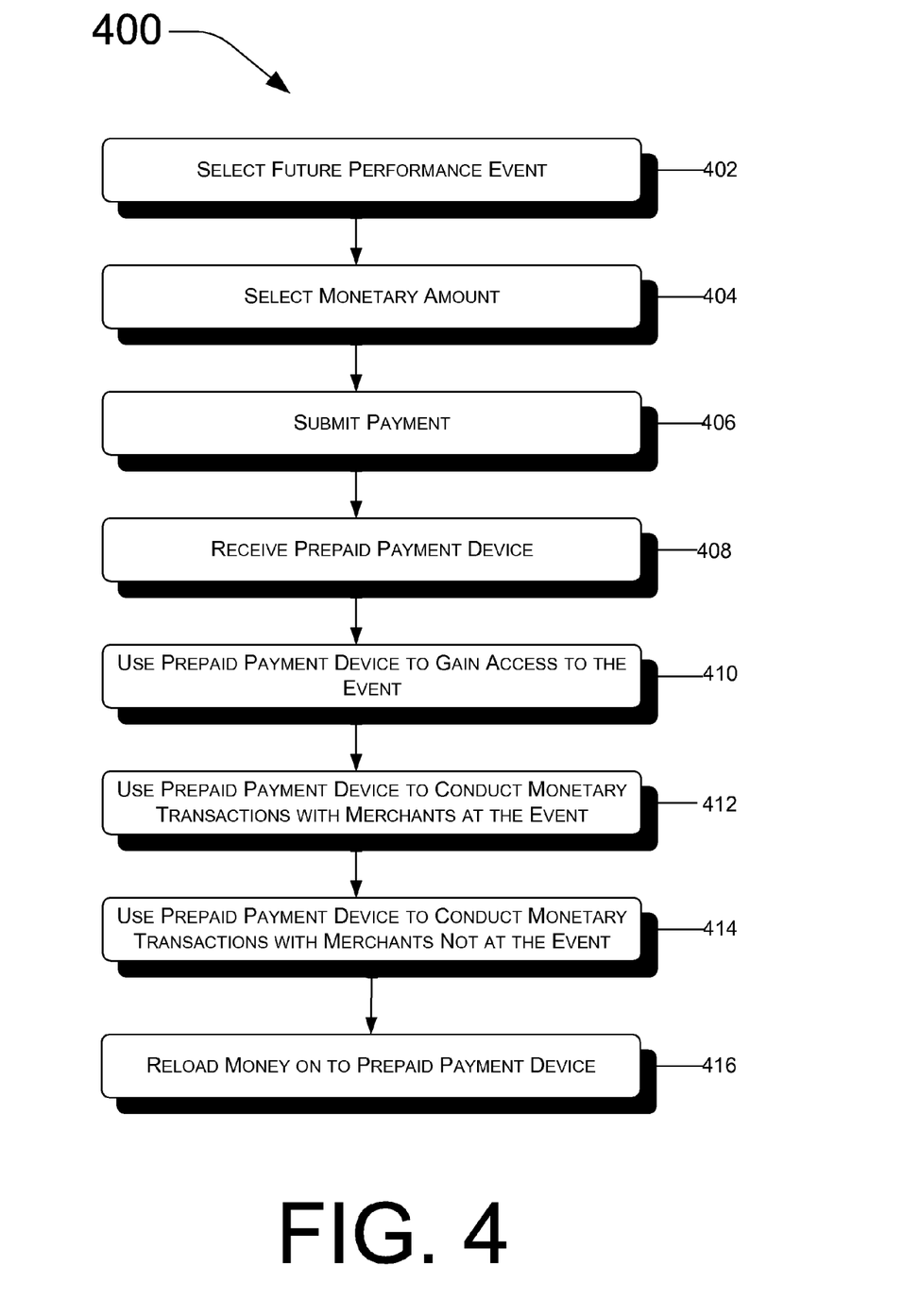
FIG. 4 is a flowchart illustrating an exemplary method of obtaining and using a prepaid payment device as an admission ticket to a future performance event at which the prepaid payment device is useable to conduct a transaction with a merchant with a stored monetary value debited to an account corresponding to the prepaid payment device.

FIG. 4 depicts a flowchart illustrating an exemplary method 400 of obtaining and using a prepaid payment device as an admission ticket to a future performance event at which the prepaid payment device is useable to conduct a transaction with a merchant with a stored monetary value debited to an account corresponding to the prepaid payment device. In step 402, a consumer, using a kiosk, selects an event to attend from multiple events presented. In other implementations, the consumer may also select a globally unique seat location from available locations in the event venue for the future performance event. The consumer may also select an image to be displayed on the surface of the prepaid payment device, where the image is associated with the event and may also be limited in number as to such prepaid payment devices. In step 404, the consumer then selects a monetary amount to be credited to an account associated with the prepaid payment device. This monetary amount is for use in a future transaction with a merchant.

In step 406, payment for admission to the event and the extra monetary amount (e.g.; over and above the price for admission the future performance event) is submitted to the user interface of the kiosk. The consumer then receives the prepaid payment device from the kiosk in step 408. The prepaid payment device corresponds to the account credited with the payment and bears stored information, including the associated account and an authorization for admission to the event. In still other implementations, the kiosk may also print, superimpose, emboss, or otherwise place on to a surface of the prepaid payment device the image selected by the consumer and other relevant event information.

In step 410, the consumer uses the prepaid payment device to gain entrance to the venue for the performance event. In one implementation, a magnetic stripe reader will read the approval of admission from a magnetic stripe on the prepaid payment device. In another implementation, the prepaid payment device may be inserted into a reader where a chip located on the card is read by direct contact with the card. In yet another implementation, the approval is read using a contactless reader.

After the consumer has been granted admission to the event, in step 412 the consumer can then use the prepaid payment device for a monetary transaction with a merchant at the event inside the venue. These merchants may or may not be the same merchant that offered admission to the event. The monetary amount credited to the account associated with the prepaid payment device is used in these transactions to purchase food or other items for sale at the event. Additionally, merchants at the event may, for example, have special lines for consumers paying with these special prepaid payment devices or may offer special discounts not available to traditional ticket holders. Further, the prepaid payment device may, in some implementations, be used to gain access to special areas of the event venue not generally accessible to other admittees.

In step 414, if, after the event, the consumer has not spent the entire monetary amount associated with the account of the prepaid payment device, the consumer can subsequently use the prepaid payment device in a transaction with a merchant who was not available conduct a transaction at the event or otherwise unassociated with the event. Once the monetary amount has been spent, in step 416 the consumer may reload the prepaid payment device with another monetary amount using, for instance, the same or another kiosk to pay for and credit a selected monetary amount to the associated account. Thus, the consumer can continue to use the prepaid payment device as a prepaid card in a function to conduct a transaction with a merchant even after the event has taken place.

Figure 5:
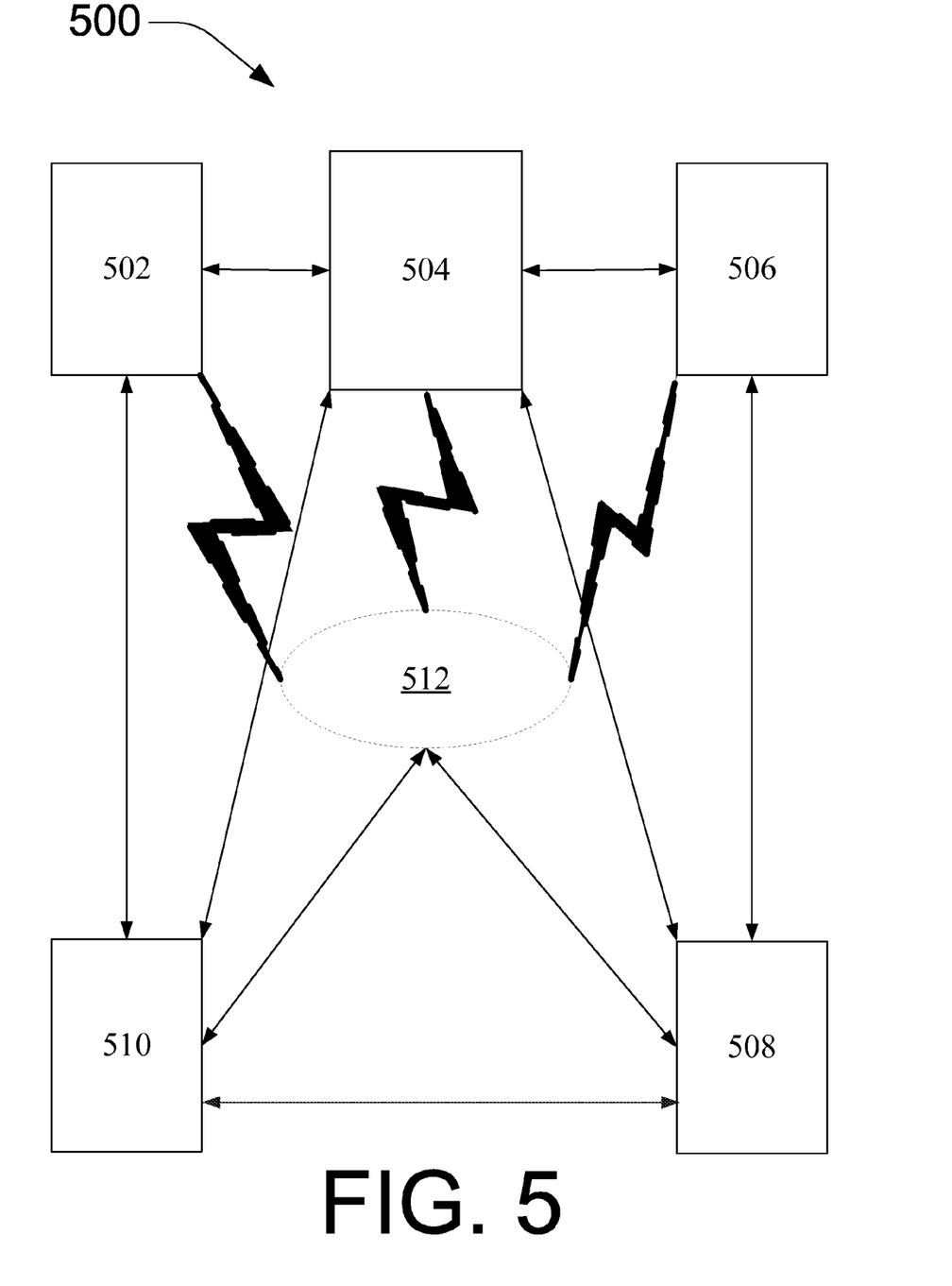
FIG. 5 illustrates an exemplary payment processing network in which the prepaid payment device of FIG. 1 can be used.

By way of example, and not by way of limitation, the disclosed prepaid payment device can be used in an exemplary payment processing system as illustrated in FIG. 5. In general, a transaction includes participation from different entities that are a component of a payment processing system 500 including an issuer 502, a transaction handler 504, such as a credit card company, an acquirer 506, a merchant 508, or a user 510, such as an account holder (e.g.; the consumer associated with the account). The acquirer 506 and the issuer 502 can communicate through the transaction handler 504. The merchant 508 may be a person or entity that sells goods or services, such as an admission to a future performance event. The merchant 508 may also be, for instance, a manufacturer, a distributor, a retailer, a load agent, a drugstore, a grocery store, a gas station, a hardware store, a supermarket, a boutique, a restaurant, or a doctor's office. In a business-to-business setting, the user 510 may be a second merchant making a purchase from another merchant 508. The merchant 508 may utilize at least one POS terminal that can communicate with the acquirer 506, the transaction handler 504, or the issuer 502. Thus, the POS terminal is in operative communication with the payment processing system 500.

Typically, a transaction begins with the user 510, such as an account holder or a consumer, presenting a portable consumer device 512 to merchant 508 to initiate an exchange for a good or service. The portable consumer device 512 may include a payment card, a gift card, a smartcard, a smart media, a payroll card, a health care card, a wrist band, a machine readable medium containing account information, a keychain device such as a SPEEDPASS® device commercially available from ExxonMobil Corporation or a supermarket discount card, a cellular phone, personal digital assistant, a pager, a security card, an access card, a wireless terminal, or a transponder. The portable consumer device 512 may include a volatile or non-volatile memory to store information such as the account number or an account holder's name.

The merchant 508 may use the POS terminal to obtain account information, such as an account number, from the portable consumer device 512. The portable consumer device 512 may interface with the POS terminal using a mechanism including any suitable electrical, magnetic, or optical interfacing system such as a contactless system using radio frequency or magnetic field recognition system or contact system such as a magnetic stripe reader. The POS terminal sends a transaction authorization request to the issuer 502 of the portable consumer device 512. Alternatively, or in combination, the portable consumer device 512 may communicate with the issuer 502, the transaction handler 504, or the acquirer 506.

The issuer 502 may authorize the transaction using the transaction handler 504. The transaction handler 504 may also clear the transaction. Authorization includes the issuer 502, or the transaction handler 504 on behalf of the issuer 502, authorizing the transaction in connection with the issuer 502's instructions such as through the use of business rules. The business rules could include instructions or guidelines from the transaction handler 504, the user 510, merchant 508, the acquirer 506, the issuer 502, a financial institution, or combinations thereof. The transaction handler 504 may maintain a log or history of authorized transactions. Once approved, the merchant 508 will record the authorization, allowing the user 510 to receive the good or service.

The merchant 508 may, at discrete periods, such as the end of the day, submit a list of authorized transactions to the acquirer 506 or other components of the payment processing system 500. The transaction handler 504 may compare the submitted authorized transaction list with its own log of authorized transactions. If a match is found, the transaction handler 504 may route authorization transaction amount requests from the corresponding acquirer 506 to the corresponding issuer 502 involved in each transaction. Once the acquirer 506 receives the payment of the authorized transaction amount from the issuer 502, it can forward the payment to merchant 508 less any transaction costs, such as fees. If the transaction involves a debit or pre-paid card, the acquirer 506 may choose not to wait for the initial payment prior to paying the merchant 508.

There may be intermittent steps in the foregoing process, some of which may occur simultaneously. For example, the acquirer 506 can initiate the clearing and settling process, which can result in payment to the acquirer 506 for the amount of the transaction. The acquirer 506 may request from the transaction handler 504 that the transaction be cleared and settled. Clearing includes the exchange of financial information between the issuer 502 and the acquirer 506 and settlement includes the exchange of funds. The transaction handler 504 can provide services in connection with settlement of the transaction. The settlement of a transaction includes depositing an amount of the transaction settlement from a settlement house, such as a settlement bank, which the transaction handler 504 typically chooses, into a clearinghouse, such as a clearing bank, that the acquirer 506 typically chooses. The issuer 502 deposits the same from a clearinghouse, such as a clearing bank, which the issuer 502 typically chooses, into the settlement house. Thus, a typical transaction involves various entities to request, authorize, and fulfill processing the transaction.

The steps of a method, process, or algorithm described in connection with the implementations disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A processor-implemented method for a user to interface with a user interface of a kiosk, the method comprising:
    selecting from a user interface of a kiosk:
        admission to a performance event;
        a monetary amount; and
        a sound corresponding to the performance event;
    submitting a payment to the user interface of the kiosk for:
        the selected admission to the performance event; and
        the monetary amount; and
    receiving from the user interface of the kiosk a prepaid payment device corresponding to a financial account that is credited with the monetary amount, wherein the credited monetary amount is acceptable for a transaction with another merchant, wherein the prepaid payment device comprises:
        a memory having stored thereon:
            sound data;
            an identifier of the financial account; and
            authorization for the selected admission to the performance event; and
        a sound producing device in communication with the memory, wherein when the sound data is processed by the sound producing device to render the sound corresponding to the performance event.

2. The method as defined in claim 1, wherein the selected admission comprises a globally unique seat location at the performance event.

3. The method as defined in claim 1, wherein the financial account uniquely corresponds to a globally unique seat location at the performance event.

4. The method as defined in claim 1, wherein the submitting of the payment comprises a payment method selected from the group consisting of paying with cash, paying with a credit card, paying with a debit card, paying with another said prepaid payment device, and a combination of the foregoing.

5. The method as defined in claim 1, wherein:
    the selecting further comprises selecting an image from a plurality thereof displayed on the user interface; and
    the received prepaid payment device bears the selected image on a surface thereof.

6. The method as defined in claim 5, wherein the selected image distinguishes the performer at the performance event.

7. The method as defined in claim 5, wherein the received prepaid payment device bearing the selected image on the surface thereof is a limited edition prepaid payment device.

8. The method as defined in claim 1, wherein the received prepaid payment device is a substantially planar laminate card.

9. The method as defined in claim 1, wherein the payment processing network further comprises a transaction handler processing a plurality of transactions each characterized by one said merchant and one said user engaging in one said transaction upon one said financial account associated by one said prepaid payment device that an issuer issues to the one said user, wherein the one said financial account contains funds, and wherein the one said merchant submits the transaction to an acquirer for processing by the transaction handler who requests the issuer to obtain payment for the one said transaction from the funds in the one said financial account, and wherein the issuer forwards the payment to the transaction handler who forwards the payment to the acquirer to pay the one said merchant for the one said transaction.

10. A prepaid payment device admission ticketing kiosk comprising:
    a memory;
    a processor disposed in communication with said memory, the processor configured to issue a plurality of instructions to:
    display a plurality of selections including:
        admission to a performance event;
        a monetary amount; and
        a sound corresponding to a performance event;
    receive selections of:
        the admission to the performance event;
        the monetary amount; and
        the sound corresponding to the performance event;
    receive payment for:
        the selected admission to the performance event; and
        the selected monetary amount;
    encode information to the prepaid payment device corresponding to a financial account wherein the prepaid payment device comprises:
        a prepaid payment device memory having stored thereon:
            sound data;
            an identifier of the financial account; and
            authorization for the selected admission to the performance event; and
        a sound producing device in communication with the prepaid payment device memory, wherein when the sound data is processed by the sound producing device to render the sound corresponding to the performance event; and dispense the prepaid payment device from the kiosk, wherein the financial account corresponding to the prepaid payment device is credited with the selected monetary amount, wherein the selected monetary amount is acceptable for a transaction with another merchant.

11. The kiosk as defined in claim 10, wherein the selected admission comprises a globally unique seat location at the performance event.

12. The kiosk as defined in claim 10, wherein the financial account uniquely corresponds to a globally unique seat location at the performance event.

13. The kiosk as defined in claim 10, wherein the payment is selectable from the group consisting of cash, credit card, debit card, another said prepaid payment device, and a combination of the foregoing.

14. The kiosk as defined in claim 10, wherein the processor issues further instructions to:
   display selectable images; and
   receive a selection of one said selectable image;
   wherein the dispensed prepaid payment device bears the one said selectable image on a surface thereof.

15. The kiosk as defined in claim 14, wherein the processor issues further instructions to:
   print the one said selectable image on the surface of the dispensed prepaid payment device.

16. The kiosk as denied in claim 14, wherein the one said selectable image distinguishes the performer at the performance event.

17. The kiosk as defined in claim 14, wherein the dispensed prepaid payment device having the one said selectable image printed thereon is a limited edition prepaid payment device.

18. The kiosk as defined in claim 10, wherein the dispensed prepaid payment device is a substantially planar laminate card.

19. The kiosk as defined in claim 10, wherein the processor issues further instructions to receive availability of the admissions to the future performance event for display.

20. A prepaid payment device comprising:
   a memory having stored thereon:
      an identifier for an associated financial account;
      authorization for an admission to a performance event; and
      sound data corresponding to the performance event;
   a sound producing device in communication with the memory, wherein the sound data is processed by the sound producing device, the sound producing device being configured to render the sound data corresponding to the performance event;
   a switch element for initiating the rendering of the sound data corresponding to the performance event wherein, the associated financial account is issued by an issuer to a consumer after the consumer submits a payment for:
      a transaction for the admission to the performance event; and
      a monetary amount;
         wherein the associated financial account is credited for the monetary amount; and
         wherein the credited monetary amount is acceptable for another transaction.

21. The prepaid payment device as defined in claim 20, wherein the authorization for the admission to the performance event comprises a globally unique seat location at the performance event.

22. The prepaid payment device as defined in claim 20, wherein the associated financial account uniquely corresponds to a globally unique seat location at the performance event.

23. The prepaid payment device as defined in claim 20, further comprising a surface bearing an image that distinguishes the performer at the performance event.

24. The prepaid payment device as defined in claim 23, wherein the prepaid payment device bearing the image thereon, is a limited edition prepaid payment device.

25. The prepaid payment device as defined in claim 20, having a form factor comprising a substantially planar laminate card.

26. The prepaid payment device as defined in claim 20, wherein the memory is selected from the group consisting of a magnetic strip, an integrated circuit, a contactless data communication device, and a combination of the foregoing.

27. An access control method that includes accepting the prepaid payment device as defined in claim 20 to grant access of an attendee to the performance event.

* * * * *